United States Patent
Shimizu et al.

(10) Patent No.: US 8,206,493 B2
(45) Date of Patent: Jun. 26, 2012

(54) GAS SEPARATION MEMBRANE

(75) Inventors: Atsushi Shimizu, Tokyo (JP); Masao Kondo, Tokyo (JP); Junichi Yamamoto, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 270 days.

(21) Appl. No.: 12/739,292

(22) PCT Filed: Oct. 23, 2008

(86) PCT No.: PCT/JP2008/069246
§ 371 (c)(1),
(2), (4) Date: Apr. 22, 2010

(87) PCT Pub. No.: WO2009/054460
PCT Pub. Date: Apr. 30, 2009

(65) Prior Publication Data
US 2010/0212504 A1   Aug. 26, 2010

(30) Foreign Application Priority Data

Oct. 26, 2007   (JP) .................... 2007-279430

(51) Int. Cl.
*B01D 53/22* (2006.01)
(52) U.S. Cl. ............. 96/13; 95/43; 95/45; 95/54; 96/12; 96/14
(58) Field of Classification Search ............... 95/43, 45, 95/54; 96/12–14
See application file for complete search history.

(56) References Cited

U.S. PATENT DOCUMENTS

| | | | | |
|---|---|---|---|---|
| 3,852,388 A | * | 12/1974 | Kimura | 264/41 |
| 4,134,742 A | * | 1/1979 | Schell | 95/53 |
| 5,674,629 A | * | 10/1997 | Avrillon | 428/473.5 |
| 7,972,566 B2 | * | 7/2011 | Ohno et al. | 422/180 |
| 2002/0038602 A1 | | 4/2002 | Nelson et al. | |
| 2006/0108279 A1 | * | 5/2006 | Kloos et al. | 210/500.21 |

FOREIGN PATENT DOCUMENTS

| | | |
|---|---|---|
| JP | 04-267934 | 9/1992 |
| JP | 06-96107 | 11/1994 |
| JP | 10-99665 | 4/1998 |
| JP | 2002-45664 | 2/2002 |
| JP | 2002-122049 | 4/2002 |
| JP | 2002-355938 | 12/2002 |
| JP | 2004-016930 | 1/2004 |
| JP | 2007-196130 | 8/2007 |
| WO | WO 90-15662 | 12/1990 |

OTHER PUBLICATIONS

Machine translation of abstract of JP 2002-045664, Feb. 12, 2002.*
Stern, Alexander S., "Polymers for gas separations: the next decade", Journal of Membrane Scinece, 94, pp. 1-65, 1994.

* cited by examiner

*Primary Examiner* — Jason M Greene
*Assistant Examiner* — Anthony Shumate
(74) *Attorney, Agent, or Firm* — Morgan, Lewis & Bockius LLP

(57) ABSTRACT

Problem to be Solved: To provide a gas separation membrane having an excellent performance balance (balance between gas permeation performance and gas separation ability) as a gas separation membrane.
Solution: A gas separation membrane comprising a porous support member and a gas separating resin layer formed on the porous support member, wherein the porous support member has a mode diameter as measured by a mercury porosimeter of from 0.005 μm to 0.3 μm, and a pore size distribution index as measured by the mercury porosimeter of from 1 to 15.

13 Claims, 7 Drawing Sheets

GAS SEPARATION MEMBRANE

This application claims priority to JP 2007-279430 and PCT/JP2008/069246.

TECHNICAL FIELD

The present invention relates to a gas separation membrane having an excellent gas separation performance.

BACKGROUND ART

A gas separation method employing a membrane has a higher energy efficiency than other gas separation methods. Further, such a gas separation method has a simple apparatus structure. For these reasons, such a gas separation method is now applied in the separation of various gases.

The most typical aspect of the gas separation membrane forms a thin film of a gas separating resin on a surface of a porous support member. This aspect is effective as a large gas permeation amount can be achieved while providing a certain level of strength to the gas separation membrane.

Recently, among gas separation membranes, it has been tried to employ a gas separation membrane which utilizes the difference between the permeability of oxygen and nitrogen in an internal combustion engine system (e.g., see Patent Document 1). This utilization method is effective in cleaning the exhaust gases in the internal combustion engine system, and in improving fuel consumption. Further, according to this utilization method, it is thought that recent environmental problems caused by exhaust gases and carbon dioxide gas can be comparatively easily resolved. For these reasons, this utilization method is attracting attention.

Patent Document 2 describes a gas permeation membrane which includes a porous support member having an ultrafiltration membrane structure.

Further, Patent Document 3 describes a gas separation membrane coated with an amorphous fluorocarbon polymer on one side of a porous support membrane composed of a polytetrafluoroethylene resin or a polyolefin resin.

In addition, Patent Document 4 describes a monolayer gas separation membrane, which has an oxygen/nitrogen separation coefficient of 1.4 or more, obtained by forming a film of a perfluorodioxole binary copolymer and then subjecting the produced film to melt-compression molding.

Patent Document 1: Japanese Patent Laid-Open No. 2002-122049
Patent Document 2: Japanese Patent Examined Publication No. 6-96107
Patent Document 3: WO90/15662 Pamphlet
Patent Document 4: Japanese Patent Laid-Open No. 10-99665

DISCLOSURE OF THE INVENTION

Problems to be Solved by the Invention

However, in the gas permeation membrane of Patent Document 2, since the polymer thin film provided on the porous support member uses a polyorganosiloxane resin, the gas permeation rate is not sufficient.

Further, in Patent Document 3, since there is no specific description about a method for maximizing the performance of the gas separation membrane, gas permeation performance cannot be sufficiently obtained.

In addition, if the thickness of gas separation membrane described in Patent Document 4 is increased in order to increase the mechanical strength of the membrane, gas separation performance deteriorates. Therefore, it was difficult to build a practical separation membrane module.

Moreover, when a conventional gas separation membrane is used in an internal combustion engine system, in the internal combustion engine system, compared with other used methods: 1) the pressure applied on the membrane is high; and 2) the temperature of the environment in which the membrane is used is high. Due to these tough conditions, the membrane may crack or deform, thereby preventing the performance of the gas separation membrane from being sufficiently exhibited. For example, the gas permeation membrane described in Patent Document 2 is based on the assumption of use at around room temperature. Therefore, the strength of the porous support member is insufficient, and there is substantial deterioration in the polymer thin film.

In view of such circumstances, it is an object of the present invention to provide a gas separation membrane having an excellent balance in its performance (balance between gas permeation performance and gas separation ability) as a gas separation membrane.

Means for Solving the Problems

As a result of intensive investigations to resolve the above-described problems, the present inventors discovered that a gas separation membrane having a porous support member, which has a mode diameter and a pore size distribution index as measured by the mercury porosimeter in a specific range, and a gas separating resin layer formed on the porous support member, has an excellent balance between gas permeation performance and gas separation ability.

More specifically, the present invention provides the following gas separation membrane.

A gas separation membrane including a porous support member and a gas separating resin layer formed on the porous support member, wherein the porous support member has a mode diameter as measured by a mercury porosimeter of from 0.005 μm to 0.3 μm; and the porous support member has a pore size distribution index as measured by a mercury porosimeter of from 1 to 15.

ADVANTAGES OF THE INVENTION

The gas separation membrane according to the present invention has a good balance between gas permeation performance and gas separation performance.

BEST MODE FOR CARRYING OUT THE INVENTION

A best mode for carrying out the present invention (hereinafter referred to as "present embodiment") will be now described in more detail. However, the present invention is not limited to the following embodiment. Various modifications may also be made within the scope of the invention.

The gas separation membrane according to the present embodiment has a porous support member and a gas separating resin layer formed on the porous support member.

Further, the porous support member has a mode diameter as measured by the mercury porosimeter of from 0.005 μm to 0.3 μm, and a pore size distribution index as measured by the mercury porosimeter of from 1 to 15.

[Porous Support Member]

The porous support member according to the present embodiment is not especially limited regarding its shape or components, as long as it needs only to have pores which pass completely from the front to the back of the porous support member. Examples of the shape may include a hollow thread-like porous support member, a film-like porous support member, a nonwoven cloth-like porous support member and the like. A film-like porous support member is preferred. Further, it is also preferred for the porous support member to be flexible and light, and be capable of increasing its surface area. Examples of the components of the porous support member may include acetate, polytetrafluoroethylene, glass fiber, polyolefin, polyether sulfone, cellulose and the like.

The porous support member according to the present embodiment has a mode diameter as measured by the mercury porosimeter of from 0.005 μm to 0.3 μm.

The mode diameter as measured by the mercury porosimeter is the pore size corresponding to the maximum value on the log differential pore volume-pore size curve measured by a mercury intrusion method.

A mercury intrusion method (mercury porosimeter) is an analysis method for measuring the pore distribution of a porous body having pores. In the pore distribution data obtained from the mercury porosimeter, the most important factors are the pressure applied on the mercury and the intrusion amount. The intrusion amount is the amount of mercury which intrudes into the pores when the applied pressure is changed during the measurement process. This intrusion amount is expressed per sample unit weight. The following relational expression exists between a pressure P applied on the mercury and a size (pore size D) corresponding to this pressure P.

$$D = -4 \times \text{surface tension} \times \cos(\text{contact angle})/P$$

Herein, the surface tension and the contact angle can be considered as constants. Thus, a series of data of the pore size can be determined based on a series of data of the pressure P. The shape of the pores can typically be assumed to be cylindrical.

Further, the log differential pore volume-pore size curve is a curve obtained by plotting the log differential pore volume (dV/d(log D)) versus the logarithm of the pore size. Here, dV, d(log D), and pore size are respectively as follows.

I. dV (Differential Pore Volume)

When the cumulative pore volume at a measurement point n is V(n), the difference (V(n)−V(n+1)) between the cumulative pore volume V(n) and V(n+1) at measurement point n and the adjacent n+1.

II. d(log D)

When the diameter of the pores (pore size) into which the mercury can penetrate at the pressure applied at measurement point n is D(n), the difference (log(n)−log(n+1)) in the logarithms of pore sizes D(n) and D(n+1) at measurement point n and the adjacent n+1.

III. Pore Size

Average of D(n) and D(n+1).

Since the porous support member has a mode diameter of 0.3 μm or less, the gas permeation rate increases. Although the reason for this is not clear, it is believed to be that, by forming a gas separating resin layer on a porous support member having a mode diameter of 0.3 μm or less, it is easier to form the gas separating resin layer as a thin film, whereby the gas permeation rate increases. The mode diameter of the porous support member as measured by the mercury porosimeter is preferably from 0.005 μm to 0.2 μm, and more preferably from 0.005 μm to 0.1 μm.

The porous support member according to the present embodiment has a pore size distribution index as measured by the mercury porosimeter of from 1 to 15.

A pore size distribution index $DI_{Hg}$ as measured by the mercury porosimeter is a value determined by $DI_{Hg} = D_b > D_a$. This value is obtained by measuring the pore sizes $D_a$ and $D_b$ ($D_b > D_a$) giving the value of half of the log differential pore volume value corresponding to the mode diameter (determined from the plot of the log differential pore volume-pore size curve). If the pore size distribution index of the porous support member as measured by the mercury porosimeter is close to 1, the balance between gas permeation rate and gas selectivity in the gas separation membrane improves. Although the reason for this is not clear, it is believed to be that if the pore size distribution index of the porous support member is in the above range, when forming the gas separating resin layer on the substrate film, the gas separating resin layer has a uniform structure which is free from pinhole defects, so that it is more difficult for pinholes (defects) to form in the gas separating resin layer.

Further, if the pore size distribution index of the porous support member as measured by the mercury porosimeter is 4 or less, the gas separation coefficient can be maintained and the gas separating resin layer can be made thinner. Therefore, the gas permeation rate of the gas which preferentially permeates the gas separating resin of the gas separation membrane dramatically increases.

Thus, the pore size distribution index as measured by the mercury porosimeter is preferably from 1.0 to 10.0, more preferably from 1.0 to 9.0, even more preferably from 1.0 to 5.5, and most preferably from 1.0 to 4.0.

Under standard coating conditions when forming a gas separating resin layer by coating, a liquid film of a coating liquid, in which a gas separating resin is dissolved, having a thickness of from about 5 to 50 μm is formed immediately after the coating on the porous support member. When the solvent evaporates during a drying process, this liquid film thins to from about 1/10 to 1/500 of its former thickness, whereby a gas separating resin layer having a thickness of from about 10 to 1,000 nm is formed. At this stage, at the locations where large pores are present in the porous support member, it is thought that defects are produced as a result of splits forming in the membrane from the surface tension when the liquid membrane thinned. If the gas flow of these defective portions is assumed to be a Knudsen flow, a separation coefficient $\alpha_{m/n}$ of a gas m and a gas n is expressed as $\alpha_{m/n} = (M_n/M_m)^{1/2}$ (wherein $M_i$ represents the molecular weight of a gas i). For gases which have a molecular weight that are close, such as oxygen and nitrogen, the separation coefficient is close to 1. Therefore, essentially, at the defective portions (Knudsen portions), the gases are not separated. Further, the defective portions have a gas permeation rate which is greater than the portions where the gas separating resin layer is present by an order or more. Therefore, even for a small amount of defects, the gas separation performance of the whole gas separation membrane can be thought to decrease. For a large pore size distribution index, there is a high ratio of pores having a large size. Therefore, if the pore size distribution index increases, the gas permeation rate of the gas separation membrane dramatically increases, and the gas separation performance dramatically deteriorates.

The mode diameter and the pore size distribution index of the porous support member according to the present embodiment as measured by the mercury porosimeter can be determined by the mercury intrusion method which is described in the following examples.

Thus, by setting the mode diameter and the pore size distribution index of the porous support member as measured by the mercury porosimeter in the above-described ranges, the gas permeation performance and the gas separation performance, such as gas separation ability, of the gas separation membrane can be set in a more satisfactory range. The mercury porosimeter mode diameter is the most frequent pore size, and is thus a value which represents the pore size of the pores in the porous support member. Further, the pore size distribution index is a value indicating the spread of the pore sizes, and thus represents the unevenness among the pore sizes in the porous support member. These values are affected by the type of method used to introduce the pores into the membrane, and the method conditions. For example, if the porous support member is a wet membrane, these values are affected by many factors, such as the amount of the paraffin additive, the amount of the filler, the temperature during pore opening, compatibility with the resin, the stretching ratio after pore opening, the crystallinity of the resin and the like. Further, if the porous support member is a dry membrane, these values are affected by many factors, such as the degree of crystallinity, the stretching ratio, speed, and temperature, the molecular weight of the resin, the resin composition and the like.

The porous support member according to the present embodiment is not especially limited, as long as the above-described structure and physical properties can be achieved. However, from the perspective of workability when forming the gas separating resin layer, it is preferred that the porous support member has a polyolefin such as polyethylene or polypropylene as a main component. More preferably, the main component is polyethylene. Further, it is preferred to use a polyolefin having a weight average molecular weight of from 100,000 to 500,000. In the present embodiment, "main component" refers to a component which takes up 60 mass % or more of the constituent components. Based on the constituent components, the ratio of the polyolefin is preferably 70 mass % or more, more preferably 80 mass % or more, and even more preferably 90 mass % or more. The polyolefin ratio may even be 100 mass %.

Examples of the polyethylene used in the present embodiment having a weight average molecular weight of from 100,000 to 500,000 may include low-density polyethylene, medium-density polyethylene, and high-density polyethylene. One kind of these may be used singly, or a combination of two or more kinds may be used. Further, not only a homopolymer, but a copolymer, such as a copolymer of ethylene and an α-olefin such as propylene, butene, pentene, hexene, and octene, or a graft polymer may also be used. Further, a mixture of such polymers may also be used.

In addition to the above-described polyolefin component, the porous support member according to the present embodiment may also include as a component ultrahigh molecular weight polyethylene to provide heat resistance. By providing heat resistance and strength, the dimensional and shape stability improve even when the gas separation membrane is used under a high-temperature environment. The ultrahigh molecular weight polyethylene according to the present embodiment is a polyethylene having a viscosity average molecular weight of from 300,000 to 4,000,000. The ultrahigh molecular weight polyethylene may not only be a homopolymer, but also a copolymer (linear copolymer polyethylene) containing 4 mol % or less based on the ethylene unit of an α-olefin unit, such as propylene, butene, pentene, hexene, and octene.

From the perspective of ease of working and the like, the viscosity average molecular weight of the ultrahigh molecular weight polyethylene is preferably 4,000,000 or less, and more preferably from 500,000 to 2,500,000. The ultrahigh molecular weight polyethylene may be formed by selecting several kinds of ultrahigh molecular weight polyethylene and blending them with the above-described polyolefin component. More preferred examples may include an ultrahigh molecular weight polyethylene formed by selecting two or three kinds from among polyethylenes having a viscosity average molecular weight of from 1,500,000 to 4,000,000, from 500,000 to 1,500,000, and from 300,000 to 500,000, and mixing them. This is because the compatibility among the mixed polyethylenes increases, and properties such as heat resistance can be fully elicited. The viscosity average molecular weight may be adjusted by performing multistage polymerization, blending with a resin or the like.

The components of the porous support member according to the present embodiment preferably are a blend of a high-density polyethylene having a weight average molecular weight of 500,000 or less and an ultrahigh molecular weight polyethylene having a weight average molecular weight of 1,000,000 or more.

From the perspective of workability, based on the total mass of the resin constituting the porous support member, the content of the ultrahigh molecular weight polyethylene is preferably from 5 mass % to 100 mass %, more preferably from 10 mass % to 50 mass %, and even more preferably from 10 mass % to 40 mass %.

When strength and heat resistance is required in the gas separation membrane according to the present embodiment, polypropylene may optionally be added as a component of the porous support member. Examples which may be used as the polypropylene may include isotactic polypropylene, atactic polypropylene, propylene-ethylene copolymer, 1-butene-propylene copolymer and the like. A preferred examples is a polypropylene including 90% or more of an isotactic polypropylene. Further, the viscosity average molecular weight of such polypropylene is preferably from 100,000 to 3,000,000, more preferably from 150,000 to 2,000,000, and even more preferably from 200,000 to 1,000,000.

If adding polypropylene, the polypropylene content is preferably, based on the total mass of the resin constituting the porous support member, from 3 mass % to 50 mass %, more preferably from 5 mass % to 40 mass %, and even more preferably from 5 mass % to 30 mass %.

The viscosity average molecular weight according to the present embodiment can be determined by the method described in the following examples. Further, the weight average molecular weight can be determined by gel permeation chromatography.

In addition to the above-described resin component, the porous support member according to the present embodiment may also include components such as an inorganic filler material, an antioxidant and the like.

Examples of the inorganic filler material may include silica, mica, talc and the like. These materials may be used alone or as a mixture. The content of the inorganic filler material is preferably, based on the total mass of the porous support member, from 5 mass % to 80 mass %, more preferably from 10 mass % to 60 mass %, and even more preferably from 20 mass % to 50 mass %. If mechanical strength is especially necessary, the used amount of the inorganic filler material is preferably less than 0.1 mass %, and more preferably less than 0.05 mass %. It is preferable to limit to within this range, since the strength of the porous support member can be maintained without minute cracks forming even for prolonged use.

Examples of the antioxidant are not especially limited, and may include monophenol-based, bisphenol-based, polymer phenol-based, amine-based, sulfur-based, and phosphate-based antioxidants. The content of the antioxidant is preferably, based on the total mass of the porous support member, from 0.01 mass % to 5 mass %, more preferably from 0.01 mass % to 2 mass %, and even more preferably from 0.01 mass % to 1 mass %.

The porous support member according to the present embodiment is preferably formed from microfibrils having a mesh structure, as the mode diameter becomes more fine. When the porous support member is formed by microfibrils having a mesh structure, the mode diameter becomes smaller and the pore size distribution index deceases. Therefore, when forming the gas separating resin layer, it is easier to form the gas separating resin layer, and the thickness of the gas separating resin layer can be made thinner.

In the present embodiment, the term "microfibrils having a mesh structure" refers to fine continuous structures which can be seen in a porous support member obtained by orienting to a high degree by stretching. Such microfibrils having a mesh structure have a thread-like or fiber-like shape. The surface structure of the porous support member according to the present embodiment is preferably configured from a mesh structure in which the microfibrils are evenly dispersed. By forming such an evenly-dispersed structure, the microfibrils having a mesh structure form a three-dimensional mesh structure in which the microfibrils intersect, merge, and branch while forming gaps among themselves, without essentially closely adhering to each other. Consequently, the porous support member has a surface structure formed from fine gaps (hereinafter referred to as "microfibril gaps") which are demarcated by the microfibrils.

When the porous support member has a microfibril structure, the above-described microfibril gaps become the pores of the porous support member. Various shapes may be employed for these gaps, such as round, oval, polygonal, irregular and the like. However, from the perspective of obtaining good gas permeability and a uniform thin film of the gas separating resin, it is preferred that the gaps have a uniform size. The thickness of the microfibrils is preferably such that 80% or more of the total of the microfibrils have a thickness of from 20 nm to 200 nm. The shape of the microfibrils can be measured by observation with a scanning electron microscope (SEM).

As the porous support member having such a structure, preferred are a polyolefin porous support member produced by a wet phase separation method, or a polyolefin porous support member produced by a dry method. From the perspective of better productivity, and that a porous support member can be obtained having a very small mode diameter while also having a small pore size distribution index, a polyolefin porous support member produced by a dry method is more preferred.

Here, the term "dry method" refers to a method for forming fine pores by stretching the film, and is also called a "stretching pore opening method". Representative examples thereof may include a method utilizing crystal interfacial peeling (lamellar pore opening method), a method utilizing interfacial peeling between a filler and a resin, and a method utilizing interfacial peeling between a plurality of resin phases.

The main control factors of the mode diameter and the pore size distribution index as measured by the mercury porosimeter according to the present embodiment are, for a wet method, the amount and type of the plasticizer to be phase separated, the phase separation conditions, and the type, amount, and extraction conditions of the inorganic filler material. For a dry method, the main control factors are the resin crystallinity, the low-temperature stretching conditions, and the high-temperature stretching.

The thickness of the porous support member is preferably from 5 µm to 200 µm, as this provides a good balance between mechanical strength and gas permeability. The lower limit for the thickness is preferably 10 µm or more, and more preferably 15 µm or more. The upper limit for the thickness is preferably 100 µm or less, and more preferably 80 µm or less.

The porosity of the porous support member is preferably from 20% to 80%, as this ensures that sufficient gas permeability and mechanical strength can be obtained. The lower limit for the porosity is preferably 30% or more, and more preferably 40% or more. The upper limit for the porosity is preferably 70% or less. The porosity may be determined by the below method described in the examples.

The permeability of the porous support member is preferably from 50 seconds to 1,500 seconds, as this allows the gas permeability to be maintained at a high level. The lower limit for the permeability is preferably 70 seconds or more, and more preferably 100 seconds or more. The upper limit for the permeability is preferably 1,000 seconds or less, and more preferably 800 seconds or less. The permeability can be measured using a Gurley permeability tester based on JIS P-8117.

The piercing strength of the porous support member can be used as an index of the mechanical strength thereof. The piercing strength of the porous support member at room temperature is preferably from 2 N to 50 N. If the piercing strength at room temperature is in this range, not only can sufficient strength be obtained even under a usage environment in which a high pressure is applied, but modularization can also be carried out easily. The lower limit for the piercing strength at room temperature is preferably 3 N or more, and more preferably 4 N or more. The upper limit for the piercing strength at room temperature is preferably 30 N or less, and more preferably 20 N or less.

Further, the piercing strength of the porous support member at 100° C. is preferably from 1 N to 50 N, and more preferably from 2 N to 50 N. If the piercing strength at 100° C. is in this range, not only is modularization easy, but a gas separation membrane can be obtained that is capable of maintaining sufficient strength even under a high-temperature usage environment. The piercing strength at 100° C. is more preferably from 3 N to 30 N, and even more preferably from 4 N to 20 N.

To adjust the piercing strength of the porous support member at 100° C. to within the above-described range, the composition, molecular weights and the like of the components constituting the porous support member can be adjusted.

The thermal shrinkage of the porous support member is preferably, at 100° C., 0% or more to 5% or less in both the machine direction (MD) and the transverse direction (TD). More preferred is, at 120° C., 0% or more to 20% or less. By setting the thermal shrinkage in this range, when processed as a module, it is more difficult for problems such as pore blockage and gas separation performance deterioration to occur. Further, it is more difficult for pore blockage to occur even if the module is used under a high temperature. Even more preferred is a thermal shrinkage, at 135° C., of 0% or more to 40% or less. To obtain a porous support member having a thermal shrinkage in this range, when producing the porous support member, the thermal shrinkage can be adjusted by controlling conditions such as the stretching factor and the heat treatment temperature. Further, the method for measuring the thermal shrinkage can be carried out based on the method in the following examples.

The porous support member according to the present embodiment may be a laminate formed from a plurality of layers consisting of the above-described arbitrary components.

[Gas Separating Resin]

The gas separating resin layer according to the present embodiment includes a gas separating resin as a main component.

The term "gas separating resin according to the present embodiment" means a resin having a nature which allows a specific gas to permeate from a gaseous mixture. Examples of gas separating resins which can be used are not especially limited, as long as the resin has a gas separation performance. Specific examples may include a fluorocarbon-based resin, silicon-based resin, polyimide-based resin, polyester-based resin, polyamide-based resin, polyether-based resin, polyacrylic-based resin and the like. Among these, a fluorocarbon-based resin is preferred, since the gas permeability is in the preferable range. More preferred is a amorphous perfluorocarbon polymer. Among these, from the perspective of improving the gas permeation rate, preferred is a copolymer with perfluoro-2,2-dimethyl-1,3-dioxole, and more preferred is a copolymer of perfluoro-2,2-dimethyl-1,3-dioxole and tetrafluoroethylene. Further, among those, the mol % of the perfluoro-2,2-dimethyl-1,3-dioxole in the copolymer is preferably from 40 mol % to 95 mol %, more preferably from 50 mol % to 90 mol %, and even more preferably from 64 mol % to 88 mol %.

The gas permeation performance of the gas separating resin can be expressed by a gas permeation coefficient and a separation coefficient $\alpha$.

Here, the permeation coefficient is the gas permeation rate per unit time, unit surface area, unit thickness, and unit pressure (differential pressure), and is a physical constant specific to that material. The units are barrer=$10^{-10}$ cm$^3$(STP)·cm/cm$^2$·sec·cmHg. Further, the gas permeation performance of the gas separation membrane as a composite material formed from a gas separating resin layer and a support is expressed by the gas permeation rate. The gas permeation rate indicates the gas permeation amount per unit time, unit surface area, and unit partial differential pressure of the whole composite material formed from the support member and the gas separating resin layer. The units are GPU (Gas Permeation Unit)=$10^{-6}$ cm$^3$ (STP)/cm·sec·cmHg.

If there are no pinholes in the gas permeation material, and the gas permeation mechanism is only via dissolution and diffusion of the gas, the value obtained by dividing the permeation coefficient of the layer which is being focused on by the thickness of that layer is equal to the above-described gas permeation rate. Even for a resin having an excellent permeation coefficient, care is required since such a resin may not be suitable for gas separation unless the resin has the necessary sufficient ability to form a thin film. Whether the resin is suitable for forming a thin film also depends on the combination of the gas separating resin, the gas separating resin solution, and the porous support member. Therefore, these are selected so that they appropriately combine. For example, a combination of a fluorocarbon-based resin as the gas separating resin, a fluorinated solvent as the solvent, and a polyolefin porous support member as the porous support member is especially preferred, because forming the gas separating resin as a thin film is easy when forming the gas separating resin layer on the porous support member.

The separation coefficient $\alpha$ according to the present embodiment refers to a ratio between the permeation coefficients or the gas permeation rates of two or more arbitrary gases.

The permeation coefficient of the gas separating resin and the separation coefficient $\alpha$ may be appropriately selected based on the intended application. For example, for use in cleaning a gas, it is preferred to have the following oxygen permeation performance. More specifically, it is preferred that the oxygen permeation coefficient of the gas separating resin is 100 barrer or more, more preferably 200 barrer or more, even more preferably 500 barrer or more, still more preferably 1,000 barrer or more, even still more preferably 1,500 barrer or more, very preferably 2,000 barrer or more, and most preferably 2,500 barrer or more. Further, considering the gas permeation coefficient of the gas separating resin which is generally obtained, 100,000 barrer or less is preferred.

When the gas separation membrane is used in the separation of oxygen and nitrogen, from the perspective of improving separation efficiency, the oxygen and the nitrogen separation coefficient $\alpha$ of the gas separating resin (=$RO_2/RN_2$) (hereinafter referred to as "oxygen/nitrogen separation coefficient) is preferably 1.1 or more. Considering the size of a practical module, 1.4 or more is more preferred, 1.5 or more is even more preferred, 1.8 or more is still more preferred, 2.0 or more is even still more preferred, 2.2 or more is still further preferred, 2.4 or more is very preferred, and 2.6 or more is most preferred. Considering the permeation coefficient of the gas separating resin which is generally obtained, 16 or less is preferred, and 10 or less is more preferred. Here, $RO_2$ means the permeation coefficient of oxygen (oxygen permeation coefficient), and $RN_2$ means the permeation coefficient of nitrogen (nitrogen permeation coefficient).

The permeation coefficient of the gas separating resin and the separation coefficient $\alpha$ measure the permeation performance of the raw materials themselves without being affected by the thickness of the gas separating resin layer and the like. It is necessary to perform the measurement using a membrane having a known thickness which is free from defects. Therefore, first, a self-supporting membrane is produced which has been cast to a thickness of from about 20 μm to 100 μm, is formed from only the raw materials, is smooth, and is free from air bubbles. The produced membrane is measured based on JIS Z-1707 to determine the permeation coefficient and the separation coefficient $\alpha$.

The separation coefficient $\alpha'$ of the oxygen and nitrogen in the gas separation membrane is expressed as follows.

$$\alpha' = F_{O2}[GPU]/F_{N2}[GPU]$$

Here, $F_{O2}$ and $F_{N2}$ are respectively the oxygen permeation rate of the gas separation membrane itself and the nitrogen permeation rate of the gas separation membrane itself. These gas permeation rates of the gas separation membrane itself include both the flux due to dissolution and diffusion of the gases and the Knudsen flow due to pinholes. In the design of an actual gas separation module, it is preferred to use these gas permeation rates of the gas separation membrane itself. The separation coefficient $\alpha'$ in this case is not a value (physical constant) specific to the material, but is an apparent value determined for the gas separation membrane itself. If there is no Knudsen flow, $\alpha'$ is the same as the ideal separation coefficient $\alpha$.

[Gas Separating Resin Layer]

The average layer thickness of the gas separating resin layer according to the present embodiment can be measured using the screen observed by a scanning electron microscope (SEM), for example. As another method, the average layer thickness of the gas separating resin layer may also be determined by calculating from the coated amount and the density based on an assumption that the porous support member has a smooth surface, and the gas separating resin is uniformly formed on that surface.

From the perspective of permeability, the gas separating resin layer preferably has an average layer thickness of 5 μm or less. From the perspective of having a good gas permeation rate, 2 μm or less is more preferable, 1 μm or less is even more preferable, and 0.4 or less is even still more preferable. Further, from the perspective of durability, 0.01 μm or more is preferable, and 0.03 μm or more is more preferable.

Moreover, the average layer thickness (D [μm]) of the gas separating resin layer can be calculated by the following equation from the attached aperture level per unit surface area (projected surface area A [m$^2$]) on the porous support member of the gas separating resin layer, and the known density (ρ [kgm$^{-3}$]) of the gas separating resin:

$$D=[W/(\rho \cdot A)] \cdot 10^6$$

From the perspective of durability, the average layer thickness of the gas separating resin layer is preferably 1 times or more the mode diameter of the porous support member, more preferably 2 times or more, and even more preferably 3 times or more. Further, from the perspective of gas permeability, 100 times or less is preferred, 80 times or less is more preferred, and 50 times or less is even more preferred.

The amount of the gas separating resin layer present on the porous support member in the present embodiment, namely, the coated amount of the gas separating resin, is preferably, from the perspective of the gas permeation rate being in a good range, 10 g/m$^2$ or less, more preferably 4 g/m$^2$ or less, and even more preferably 2 g/m$^2$ or less. Further, from the perspective of durability of the coated amount, 0.01 g/m$^2$ or more is preferred, and 0.06 g/m$^2$ or more is more preferred.

[Gas Separation Membrane]

The gas separation membrane according to the present embodiment has a composite structure of a porous support member and a gas separating resin layer containing a gas separating resin as a main component which is formed on a surface of the porous support member.

This composite structure is a structure in which a thin film of a gas separating resin is formed on at least one surface of the porous support member, and the porous support member and the gas separating resin layer are closely adhered to each other. The gas separating resin layer is preferably present across all of the surface of the porous support member.

Further, a film of the gas separating resin may also be formed in the interior of the porous support member, for example, in the microfibril gaps or the like.

From the perspective of balance between durability and workability, the average membrane thickness of the gas separation membrane according to the present embodiment is preferably from 5 μm to 200 μm, more preferably from 10 μm to 150 μm, and even more preferably from 15 μm to 100 μm.

The gas to be separated using the gas separation membrane according to the present embodiment is not especially limited. Examples thereof may include, oxygen, nitrogen, carbon dioxide gas, ammonia, rare gases such as helium, hydrocarbons and the like. Among these, oxygen, nitrogen and the like are preferred.

When the gas separation membrane is used to separate oxygen from a gas (e.g., nitrogen etc.) which does not permeate the gas separation membrane as easily as oxygen, from the perspective of a practical module size, the oxygen permeation rate of the gas separation membrane is preferably 100 GPU or more, more preferably 200 GPU or more, even more preferably 500 GPU or more, and even still more preferably 700 GPU or more. Considering the available materials, the upper limit of the oxygen permeation rate is 100,000 GPU or less. From a practical standpoint, the oxygen permeation rate is preferably 10,000 or less.

When the gas separation membrane is used in the separation of oxygen and nitrogen, from the perspective of improving separation efficiency, the oxygen and the nitrogen separation coefficient α of the gas separation membrane ($=RO_2/RN_2$) is preferably 1.1 or more, more preferably 1.4 or more, still more preferably 1.5 or more, even still more preferably 1.8 or more, and especially preferably 2.0 or more. From a practical perspective, the upper limit is preferably 16 or less, and more preferably 10 or less.

It is preferred that the above-described oxygen permeation rate and the separation coefficient α can maintain the above-described ranges even after heat treating the gas separation membrane at 100° C. Examples of a method to maintain the ranges may include using a heat resistant resin as the resin forming the porous support member.

The oxygen permeation rate and the separation coefficient α can be adjusted by controlling the mode diameter and pore size distribution index of the porous support member as measured by the mercury porosimeter, the selection of the gas separating resin, and the average layer thickness of the gas separating resin layer. It is preferred that the porous support member mode diameter is small and pore size distribution index is small (close to 1), as it is easier to form a thin film of the gas separating resin layer. Further, it is preferred that the average layer thickness of the gas separating resin layer is thin, as the oxygen permeation rate increases.

Generally, for a gas separation membrane formed with a gas separating resin layer on a porous support member, if the gas separating resin layer is made thinner, pinholes increase. This means that although the gas permeation coefficient increases, the gas separation coefficient decreases. Accordingly, the gas permeation coefficient and the gas separation coefficient are in an inverse relationship. It is preferred that the pore size distribution index of the porous support member as measured by the mercury porosimeter is 15 or less, more preferred is 10 or less, still more preferred is 5 or less, and most preferred is 4 or less.

From the perspective of striking a good balance between the gas permeation rate and the gas separation performance, it is especially preferred to make the pore size distribution index of the porous support member as measured by the mercury porosimeter to be 4 or less.

Measurement of the oxygen permeation rate and the separation coefficient α as well as 100° C. heat treatment can be carried out based on the methods described in the following Examples.

The mechanical strength of the gas separation membrane can be determined as an index based on piercing strength. The piercing strength of the gas separation membrane at room temperature is preferably from 2 N to 50 N. If the piercing strength at room temperature is in this range, not only can sufficient strength be obtained even under a usage environment in which a high pressure is applied, but modulization can also be carried out easily. The lower limit for the piercing strength at room temperature is preferably 3 N or more, and more preferably 4 N or more. The upper limit for the piercing strength at room temperature is preferably 30 N or less, and more preferably 20 N or less.

The heat resistance of the gas separation membrane can also be determined as an index based on the piercing strength at 100° C. The piercing strength of the gas separation membrane at 100° C. is preferably from 1 N to 50 N, and more preferably from 2 N to 50 N. If the piercing strength at 100° C. is in this range, not only is modularization easy, but sufficient strength can be maintained even under a high-temperature usage environment. The piercing strength at 100° C. is more preferably from 3 N to 30 N, and even more preferably from 4 N to 20 N.

To adjust the piercing strength of the gas separation membrane at 100° C. to within the above-described range, the composition, molecular weights and the like of the resin constituting the porous support member can be adjusted.

The thermal shrinkage of the gas separation membrane is preferably, at 100° C., 0% or more to 5% or less in both the machine direction (MD) and the transverse direction (TD). More preferred is, at 120° C., 0% or more to 20% or less. By setting the thermal shrinkage in this range, when processed as a module, it is more difficult for problems such as pore blockage and gas separation performance deterioration to occur. Further, it is more difficult for pore blockage to occur even if the module is used under a high temperature. Even more preferred is a thermal shrinkage, at 135° C., of 0% or more to 40% or less. When producing the porous support member, the thermal shrinkage can be adjusted by controlling conditions such as the stretching factor and the heat treatment temperature. Further, the method for measuring the thermal shrinkage can be carried out based on the method in the following examples.

[Porous Support Member Production Method]

The porous support member according to the present embodiment can be produced by a dry method or a wet method. The wet method is preferable, because a wide variety of porous support members can be produced since the method has a wide control range of the mode diameter and the pore size distribution index. The dry method is more preferable, because a porous support member obtained by such method can have a small mode diameter and pore size distribution index.

An example of a method for producing the porous support member by the dry method is as follows.

The resin forming the porous support member is melt-extruded from a T die. The extruded melt resin is cooled by a cooling roll, cool air and the like, and then picked up on a roll to produce an un-stretched film. The resin is not especially limited, as long as it can be extruded and molded as a crystalline polymer. Examples thereof may include olefin resins. More specific examples may include polyethylene or polypropylene. When carrying out the melt-molding by a T die, this step is generally carried out at a temperature 20° C. to 60° C. higher than the melting temperature of the resin. The draft ratio is generally from 10 to 1,000, and preferably from 200 to 500. The take-off rate is not especially limited, and is generally from 10 m/min to 50 m/min. This take-off rate affects the elastic recovery of the resin, and the mode diameter and porosity after stretching.

When producing a laminated film, a predetermined resin film is produced based on the same steps as described above, and then either a predetermined number of films are brought together and thermocompressed by a heating roll to produce a single laminate layer, or the resin films are coextruded to produce a sheet.

Pores are opened between the crystalline lamellas by subjecting the single layer or the laminated film obtained in the above step to low-temperature stretching at a temperature at or lower than the melting point. Although the temperature at this stage is adjusted based on the type of resin, generally the temperature is around room temperature. Further, the pore-formed film is subjected to heated stretching at a temperature lower than but close to its melting point to control the degree of pore opening between the crystalline lamellas, whereby the mode diameter can be adjusted. Subsequently, thermal setting may optionally be carried out by slightly shrinking the film at a fixed temperature to ease stress.

Examples of methods for producing the porous support member by the wet method may include the following method, which combines a phase separation method and biaxial stretching.

More specifically, a mixture of the components forming the porous support member is dissolved in a plasticizer (solvent) at a temperature at or higher than the melting point of the included resin component. The resultant solution is cooled down to a crystallization temperature or less of the included resin to produce a polymer gel. Next, a film is formed using the produced polymer gel (film-forming step). The obtained film is biaxially stretched (stretching step). Then, the plasticizer is removed from the film (plasticizer removal step). Therefore, as illustrated by the (plasticizer removal step), a method for producing a porous support member which includes a film-forming step and a plasticizer removal step is called a "phase separation method".

The method for producing the porous support member when polyethylene is the main component will be described in more detail. As the plasticizer, an organic compound is used which capable of forming a uniform solution with polyethylene at a temperature at or lower than its boiling point. Specific examples of such an organic compound may include decalin, xylene, dioctyl phthalate, dibutyl phthalate, stearyl alcohol, oleyl alcohol, decyl alcohol, nonyl alcohol, diphenyl ether, n-decane, n-dodecane, paraffin oil such as liquid paraffin and the like. Among these, paraffin oil, dioctyl phthalate, and decalin are preferred. The ratio of the plasticizer in the polymer gel is not especially limited, and is preferably from 20% to 90%, and more preferably from 50% to 80%. If the ratio is in this range, it is easier to obtain by continuous molding a porous support member having an appropriately mode diameter and pore size distribution index.

The film-forming method is not especially limited. examples of such method may include the following. First, the raw material resin powder and plasticizer are fed into an extruder, and both these materials are melt-kneaded at a temperature of about 200° C. Next, the mixture is cast onto a cooling roller from a typical coat hanger die or a T die, to continuously mold a sheet having a thickness of a few tens of μm to several mm. As the molding method, cooling to solidification by a press or molding with a T die is preferred, and molding with a T die is more preferred.

Next, the obtained sheet is stretched in at least one axial direction to form an oriented film. The stretching method is not especially limited, and tenter stretch, roll stretch, calendaring and the like may be used. Among these, simultaneous biaxial stretching by the tenter method is especially preferred. The stretching temperature can be from room temperature to the melting point of the polymer gel. Preferably, the temperature is from 80° C. to 140° C., and more preferably from 100° C. to 130° C. The stretching factor is, based on the surface area, preferably from 4 times to 400 times, more preferably from 8 times to 200 times, and even more preferably from 16 times to 100 times. If the stretching factor is in this range, a porous support member having sufficient strength and an appropriately mode diameter and pore size distribution index can be obtained. Further, since the stretching is easy, productivity is also good.

In addition, the porous support member is obtained by removing the plasticizer from the oriented film. The method for removing the plasticizer is not especially limited. For example, if paraffin oil or dioctyl phthalate is used as the plasticizer, these may be extracted with an organic solvent such as methylene chloride or methyl ethyl ketone. Then, after extracting the organic solvent, the resultant film is heated and dried at a temperature equal to or lower than the melting temperature of the film and thereby the organic solvent can be more thoroughly removed. Further, if, for example, a low-boiling-point compound such as decalin is used as the plasticizer, such compound can be removed simply by heating and drying at a temperature at or lower than the melting temperature of the porous support member. For either case, to prevent deterioration of the physical properties due to shrinkage of the film, it is preferred to remove the plasticizer while restraining the film by fixing or the like.

To improve gas permeability and increase dimensional stability, it is optionally also preferred to subject the thus-obtained porous support member to a heat treatment at a temperature at or lower than the melting temperature.

The nature of the porous support member is an important factor in determining the performance of a gas separation membrane.

For example, it is preferred that the gas permeation coefficient of the porous support member is larger than the permeation coefficient required for the gas separation membrane by an order or more. For example, if the oxygen permeation coefficient of the gas separation membrane is 2,000 GPU, the oxygen permeation coefficient of the porous support member is preferably 10,000 GPU or more, and more preferably 20,000 GPU or more.

Further, the present inventors discovered that, when a gas separating resin layer is formed on the surface and/or in the interior of the porous support member, the performance of the gas separation membrane improves the smoother the surface of the porous support member is. Although the reason for this is not clear, it is thought to be as follows. Since it can be thought that the pores in the porous support member are similarly distributed in the convex portions of the porous support member as in the concave portions, during the step of drying the coated solution, a thicker film tends to be formed for the concave portions than for the convex portions of the porous support member. Therefore, coating defects occur more often in the convex portions.

The surface roughness of the porous support member can be measured by an AFM (atomic force microscope). In the present invention, roughness of a line scan linear roughness is measured based on JIS B0601 (2001). Further, roughness of a surface scan can be measured by sampling a plurality of rows in the machine direction of the roughness of a line scan in the transverse direction, and averaging the data. The surface roughness of the porous support member is preferably 350 nm or less, more preferably 200 nm or less, and most preferably 150 nm or less.

[Gas Separation Membrane Production Method]

The method for producing the gas separation membrane is not especially limited. However, a preferred method is to coat a gas separating resin solution having a concentration of from 0.01 mass % to 50 mass % on a surface of the porous support member to form a gas separating resin layer. It is more preferred to use a gas separating resin solution having a concentration of 10 mass % or less. By lowering the concentration of the gas separating resin solution, a thin film can be formed on the porous support member. Previously, many materials have been reported regarding gas separating resins. Examples thereof may include the polymers described in Alexander Stern, Journal of Membrane Science, 94 (1994) 1-65, Elsevier Science B.V., Amsterdam. There are no particular limitations on the use of these resins. It is preferred to select as the solvent for dissolving the gas separating resin a solvent which is a good solvent for the gas separating resin to be used, and which has a boiling point in the range of room temperature to 300° C. For example, when using a fluorocarbon-based resin, a fluorinated solvent is preferred. When using a hydrocarbon-based resin, such as a polyester-based resin, a hydrocarbon-based solvent is preferred. A fluorocarbon-based resin is preferred because of a high gas permeation coefficient. Teflon-AF (manufactured by Dupont) has an especially high gas permeation coefficient, and is thus more preferred. A fluorinated solvent is suitable as the solvent for dissolving a fluorocarbon-based resin. Examples thereof include, manufactured by 3M, FC-72, PF-5060, FC-84, PF-5070, PF-5080, FC-3283, FC-40, FC-43, FC-70, Novec HFE-7100, Novec HFE-7200m, Novec 7300, Novec 7600, FC-770 and the like.

The temperature during coating can be in a wide range of from around room temperature to near the boiling point of the solvent. The drying time and the drying temperature should be controlled based on the rate of volatilization of the solvent. If solvent remains in the coated film, the remaining solvent should be volatilized as much as possible, as depending on the amount of remaining solvent, the gas separation performance can change.

If a low concentration gas separating resin solution is used, the gas separating resin can infiltrate into the porous support member, thereby making it difficult to form a uniform thin film on the porous support member surface. Therefore, it is preferred to adjust the concentration, surface tension, molecular weight, and solubility parameters of the gas separating resin, and the viscosity, polarity, and surface tension of the solvent, to match the mode diameter, surface tension, and solubility parameters of the porous support member to be used. For example, it is preferred to increase the molecular weight of the gas separating resin, or to use a solvent which has a strong interaction with the gas separating resin, since it is easier to form the film on the porous support member surface. Thus, by appropriately selecting and combining the molecular weight of the gas separating resin, the type of solvent, the viscosity of the solution, and the coated amount, a highly-reliable, very thin gas separating resin layer film can be formed in which cracks in the surface of the porous support member do not easily occur.

As the coating method, it is preferred to coat a predetermined amount of the gas separating resin solution on one or both sides of a film-like porous support member, and then dry the coated resin. The coating method at this stage is preferably carried out by dip coating, micro gravure coating, die coating, spray coating and the like. Micro gravure coating and dip coating are more preferred, due to their suitability for thin film coating. In typical dip coating, the film-like porous support member is dipped in a bath containing the gas separating resin solution. Then, the amount of solution on the porous support member surface is adjusted by a reverse roll, a kiss roll and the like, so that a predetermined gas separating resin layer is formed. Subsequently, the resin layer is dried. In micro gravure coating, reverse type coating, in which the rotating direction of the micro gravure roll is the opposite of the progress direction of the substrate, is more preferred, as the thickness of the coated film becomes more uniform.

Further, the solvent of the coated solution volatilizes immediately after the coater head part. Therefore, from the perspective of maintaining the quality of the gas separation membrane, management of the dew point over the section from the coater head part to the drying furnace is important. When the solvent volatilizes, the substrate is cooled by the latent heat of vaporization. However, if the temperature at that point reaches the dew point of the surrounding environment, fine water droplets form on the coated liquid film. These water droplets act as molds for crater-shaped coating defects to form on the coated film. Since the gas separating resin layer is not present in these defective portions, there is no gas separation performance due to dissolution or diffusion of the gas. Therefore, it is important to manage so that the temperature is lower than the dew point around the coater head.

In addition, to improve the adhesion between the gas separating resin layer and the porous support member, it is preferred to perform a discharge treatment or the like on the surface of the porous support member.

In the present embodiment, a laminated gas separation membrane formed from the above-described gas separating resin layer on the above-described porous support member has a gas separation performance not found conventionally. Therefore, this gas separation membrane can be used as a membrane for various kinds of gas separation. Among those, this gas separation membrane is useful when used as a nitrogen-enriched membrane or an oxygen-enriched membrane. Depending on the conditions, a gas separation membrane can also be obtained which can maintain strength, heat resistance, and gas separation ability under heat-resistant conditions. Thus, this gas separation membrane having an excellent performance can be utilized as the gas separation membrane for gas cleaning used in an internal combustion engine system.

[Gas Separation Module]

The gas separation membrane according to the present embodiment can be used in a common gas separation module which uses a film-like membrane. The module shape is not especially limited. The gas separation membrane according to the present embodiment can also be used by processing into a pleated shape.

EXAMPLES

The present embodiment will now be described in more detail based on the following examples. However, the present embodiment is in no way limited to these examples. The test methods and treatment methods shown in the examples and comparative examples are as follows.

(1) Mode Diameter and Pore Size Distribution Index (Mercury Intrusion Method) as Measured by the Mercury Porosimeter Using the Shimadzu Autopore 9220 (Shimadzu Corporation) as the measurement apparatus, about 0.15 g of a porous support member was cut to a width of about 25 mm. This cut member was folded, placed in a standard cell, and measured under conditions of an initial pressure of 20 kPa (equivalent to about 3 psia, pore size of 60 μm). The number of measurement points was set at 130, and these points were spaced at logarithmically equal intervals. The data was arranged with the logarithm of the pore size on the horizontal axis, and the log differential pore volume on the vertical axis.

The calculation formula was as follows.

$V(n)[mL/g]$: Cumulative pore volume $D(n)[\mu m]$: Pore size $\Delta V[mL/g] = V(n) - V(n+1)$: Differential volume $dV/d\log D[mL/g] = \Delta V/[\log D(n) - \log D(n+1)]$: Log differential pore volume $Dm\ [\mu m]$: Mode diameter (pore size corresponding to maximum value on the log differential pore volume curve)

$DI_{Hg}$: Pore size distribution index ($DI_{Hg} = D_b > D_a$, in which pore sizes $D_a$, $D_b$ ($D_b > D_a$) giving the value of half of the log differential pore volume value corresponding to the mode diameter is read from the mode diameter peak)

(2) Observation Conditions Using Scanning Electron Microscope (SEM)

Scanning electron microscope (SEM) observation was carried out under the following conditions.

Sample: A microscopy sample was produced by cutting a porous support member into an appropriate size, fixing the cut porous support member on a sample stand, and coating about 6 nm of Os thereon.

Apparatus: Hitachi S-4700
Acceleration voltage: 1 kV
Mode: Ultra high resolution
Detector: Upper Based on these conditions, a microfibril structure was observed using the scanning electron microscope (SEM).

(3) Porous Support Member Thickness and Gas Separation Membrane Average Thickness Measurement was carried out using a dial gauge ("Peacock No. 25®", Ozaki Mfg., Co., Ltd.).

(4) Porous Support Member Porosity

A 10 cm-square sample was taken from the porous support member, and porosity was calculated using the following formula based on the volume and mass of the sample. The resin density (g/cm³) was measured by a density gradient method based on ASTM-D1505.

$$\text{Porosity}(\%) = [\text{Volume}(cm^3) - \text{Mass}(g)/\text{Resin density}]/\text{Volume}(cm^3) \times 100$$

Here, the term "resin density" means the density of the resin which is the component of the porous support member.

(5) Porous Support Member Permeability

Measurement was carried out using a Gurley permeability tester based on JIS P-8117.

(6) Porous Support Member and Gas Separation Membrane Piercing Strength (Room Temperature)

Using the "KES-G5 Handy Compression Tester®" manufactured by Kato Tech Co., Ltd., a piercing test was carried out under conditions of a needle tip curvature radius of 0.5 mm and a piercing rate of 2 mm/sec, to measure the maximum piercing load (N) at room temperature.

(7) Porous Support Member and Gas Separation Membrane Piercing Strength (100° C.)

A porous support member or a gas separation membrane was sandwiched by two stainless steel washers having an inner diameter of 13 mm and an outer diameter of 25 mm. The resultant structure was held by clips at four places on the periphery, and then dipped in silicon oil (KF-96-10CS, manufactured by Shin-Etsu Chemical Co. Ltd.). After one minute, the piercing strength at 100° C. was measured in the same manner as in (5).

(8) Porous Support Member and Gas Separation Membrane Thermal Shrinkage (%)

Ten cm-square samples were cut both longitudinally (in the machine direction) and transversely (in the cross direction) from the porous support member or the gas separation membrane. The samples were then placed in a circulating hot air oven heated to a predetermined temperature (100° C., 120° C., and 135° C.) in a state in which the four sides of the samples were not restrained. After heating for two hours, the samples were removed from the oven and left to cool for 30 minutes. The longitudinal (machine direction) and transverse (cross direction) dimensions of the samples were then measured and calculated.

(9) Viscosity Average Molecular Weight

A sample solution was prepared by dissolving the resin component of the porous support member in decahydronaphthalene. The intrinsic viscosity [η] of this sample solution was measured using a Cannon-Fenske viscometer (SO100) in a temperature-controlled bath for kinematic viscosity measurement adjusted to 135° C. Using the obtained [η], the viscosity average molecular weight was calculated based on the following Chang equation.

$[\eta]=6.77\times10^{-4}\times M v^{0.67}$

(10) Weight Average Molecular Weight

Using a TSK gel GMHhr-H(S)HT column (manufactured by Tosoh Corporation), the weight average molecular weight was measured by a high-temperature GPC apparatus (Tosoh HLC-8121 GPC) having an RI detector. As the solvent, ortho-dichlorobenzene was used in the mobile phase. The measurement was carried out at a temperature of 140° C. at a solvent flow rate of 1 mL/min. The molecular weight was determined in terms of polystyrene by producing a calibration curve using a polystyrene standard (manufactured by Tosoh Corporation).

(11) Inorganic Filler Material Content in the Porous Support Member

The content of the inorganic filler material was determined using an X-Ray fluorescence apparatus.

(12) Gas Separating Resin Solution Preparation

A perfluoro amorphous polymer (Teflon® AF1600, density 1.78 g/cm³, manufactured by Dupont) was dissolved in a concentration of 1.25 mass % in a fluorine-based solvent (Novec 7300, manufactured by 3M) having a boiling point of 93° C.

(13) Production of Gas Separation Membrane

Using a micro gravure coating machine (manufactured by Yasui Seiki Co., Ltd.), the gas separating resin solution prepared in the above (12) was coated on a porous support member having a width of 50 cm. The coating conditions were as follows.

Coating rate: 4 m/min

Micro gravure roll: #180 (diameter 30 mm, 180 grooves per inch)

Micro gravure roll rotation speed: 40 rpm (reverse rotation with respect to the substrate progression direction)

Drying temperature: 24° C.

Distance between coater head and pick-up roll: About 10 m

(14) Gas Separation Membrane Gas Permeability

The gas separation membrane was cut into a circle 47 mm in diameter, and fixed in a stainless steel holder (KS-47F Holder, manufactured by Advantec Co., Ltd.). The cut circle of the gas separation membrane was then subjected from the primary side of the holder to a predetermined pressure of 99.9% or more of oxygen or 99.9% or more of nitrogen. After confirming with an oxygen concentration detector that the atmosphere on the secondary side had been replaced with 99% or more of oxygen or 99% or more of nitrogen, the level of gas which permeated was measured using a soap film flowmeter. The gas permeation rate (GPU: Gas permeation unit=$10^{-6}$ cm³ (STP)/cm³·sec·cmHg) of the gas separation membrane in a standard state was calculated based on the permeated gas level, temperature, and atmospheric pressure. Further, the separation coefficient α' was calculated based on the ratio between the gas permeation rates of the oxygen and the nitrogen.

(15) Gas Separation Membrane Heat Treatment

The gas separation membrane measured in the above (14) was, while still fixed in the holder, placed as is in a circulating hot air oven heated to 100° C. and heated for 100 hours. The gas separation membrane was then removed. Once it was confirmed that the temperature of the gas separation membrane had returned to room temperature, the gas separation performance was measured.

(16) Measurement of Porous Support Member Surface Roughness by AFM

Using the following apparatus, measurement was carried out under the following conditions.

Measurement apparatus: AFM Measuring Apparatus VN8000 (manufactured by Keyence Corporation, vertical resolution 0.1 nm), or a Nanopics-1000 (manufactured by SII NanoTechnology Inc., vertical resolution 0.5 nm)

Measurement conditions

View angle: 50 μm (VN8000), 100 μm (Nanopics-1000)

Measurement mode: Standard DFM-H (VN8000), dumping mode (Nanopics-1000)

The roughness of a line scan was measured based on JIS B0601 (1994, 2001). Surface roughness was taken as the average of the roughness of the line scan data 384 line (VN8000) or the average of the roughness of the line scan data 256 line (Nanopics-1000).

Reference Examples

Porous support members were produced in the following manner.

Reference Example 1

Sixty parts by mass of high-density polyethylene (viscosity average molecular weight 280,000) and 0.3 parts by mass of an antioxidant (Adeka Stab® AO-30) were mixed together. The resultant mixture was fed into a twin-screw extruder via a feeder. Then, 100 parts by mass of liquid paraffin (kinematic viscosity at 37.78° C. of 75.9 cSt) was melt-kneaded into the mixture at 200° C. by feeding the liquid paraffin into the twin-screw extruder by a side feeder. The obtained polymer gel was extruded from a T die arranged on the tip of the twin-screw extruder, then immediately cooled and solidified by a cast roll cooled to 25° C. to form a sheet having a thickness of 1.3 mm.

This sheet was simultaneously stretched at 120° C. by a factor of 7×7 with a biaxial stretching machine. The oriented film was dipped in methyl ethyl ketone to extract the liquid paraffin. The oriented film from which the liquid paraffin had been removed was dried, and then heat-set at 130° C. to obtain a porous support member. The obtained porous support member had apertures of 12 g/m². Further, the piercing strength for a thickness of 20 μm, porosity of 40%, gas permeability of 300 seconds, at 100° C. was 3.5 N, and the thermal shrinkage at 100° C. was 1.5% in the MD and 1.0% in the TD. The produced porous support member is designated as "porous support member 1". The mode diameter and the pore size distribution index measured using a mercury porosimeter were determined based on the above-described method (1). The results are shown in Table 1 and FIG. 1. Further, when observed based on the above-described method (2), the surface structure was observed to be a microfibril structure.

The surface roughness based on AFM (Nanopics-1000) was 324 μm.

Reference Example 2

Twenty parts by mass of high-density polyethylene (viscosity average molecular weight 280,000), 10 parts by mass of ultrahigh molecular weight polyethylene (viscosity average molecular weight 2,000,000), and 0.3 parts by mass of an antioxidant (Adeka Stab® AO-30) were mixed together. The resultant mixture was fed into a twin-screw extruder via a feeder. Then, 100 parts by mass of liquid paraffin (kinematic viscosity at 37.78° C. of 75.9 cSt) was melt-kneaded into the mixture at 240° C. by feeding the liquid paraffin into the twin-screw extruder by a side feeder. The obtained polymer gel was extruded from a T die arranged on the tip of the twin-screw extruder, then immediately cooled and solidified by a cast roll cooled to 25° C. to form a sheet having a thickness of 1.0 mm.

This sheet was simultaneously stretched by a factor of 7×7 with a biaxial stretching machine at 125° C. The oriented film was then dipped in methyl ethyl ketone to extract the liquid paraffin. The oriented film from which the liquid paraffin had been removed was then dried to obtain a porous support member. The obtained porous support member had apertures of 10 g/m$^2$. Further, the piercing strength for a thickness of 16 μm, porosity of 39%, gas permeability of 400 seconds, at 100° C. was 4.0 N, and the thermal shrinkage at 100° C. was 5.0% in the MD and 5.0% in the TD. The produced porous support member is designated as "porous support member 2". The mode diameter and the pore size distribution index measured using the mercury porosimeter were determined based on the above-described method (1). The results are shown in Table 1 and FIG. 2. Further, when observed based on the above-described method (2), the surface structure was observed to be a microfibril structure.

The surface roughness based on AFM (Nanopics-1000) was 158 μm.

Reference Example 3

Using a T die having a discharge width of 1,000 mm and a discharge lip opening of 2 mm, high-density polyethylene having a density of 0.964 and a melt index of 0.3 was melt-extruded at 177° C. The discharged film was introduced onto a 120° C. cooling roll, and 25° C. cool air was blown onto the film to cool it. The cooled film was then picked up at 35 m/min. The draft ratio at this stage was 380. The obtained un-stretched polyethylene film had a thickness of 13 μm.

Using a T die having a discharge width of 1,000 mm and a discharge lip opening of 4 mm, polypropylene having a number average molecular weight of 70,000, a weight average molecular weight of 480,000, and a melt index of 3 was melt-extruded at 200° C. The discharged film was introduced onto a 90° C. cooling roll, and 25° C. cool air was blown onto the film to cool it. The cooled film was then picked up at 31.5 m/min. The draft ratio at this stage was 365. The obtained un-stretched polypropylene film had a thickness of 13 μm.

Two un-stretched polypropylene film rolls and one un-stretched polyethylene film roll were arranged on a roll stand. The polyethylene was arranged so as to be sandwiched by the two polypropylene films. The un-stretched polypropylene films and the un-stretched polyethylene film were each unwound at an unwinding rate of 5.4 m/min, guided to a heating roll, and bonded by thermocompression at a temperature of 130° C. and a linear pressure of 1.8 kg/cm to obtain a laminated film having a sandwich structure. Then, at the same rate, the laminated film was guided to a 50° C. cooling roll and wound up. The rate at this stage was 5.45 m/min, and the unwinding tension was 3 kg for the polypropylene films and 0.9 kg for the polyethylene film. The obtained laminated film had a thickness of 35 μm, and a release strength of 7.3 g/15 mm.

This three-layer laminated film was introduced into a circulating hot air oven heated to 125° C., and heat treated for 113 seconds under a 5% strain. The heat-treated laminated film was then subjected to low-temperature stretching of 20% between nip rolls kept at 35° C. The roll gap at this stage was 350 mm, and the roll speed on the supply side was 1.6 m/min. Then, the laminated film was again introduced into a circulating hot air oven heated to 110° C. to carry out high-temperature stretching between the rollers by utilizing the difference in roll periphery speeds until the total stretching amount was 115%. The resultant laminated film was then relaxed by 16.7% by a roll heated to 125° C., and heat-set for 25 seconds to continuously obtain a laminated porous support member.

The obtained porous support member had apertures of 15 g/m$^2$. Further, the piercing strength for a thickness of 25 μm, porosity of 45%, gas permeability of 450 seconds, at 100° C. was 2.7 N, and the thermal shrinkage at 100° C. was 5.0% in the MD and 0% in the TD. The produced porous support member is designated as "porous support member 3". The mode diameter and the pore size distribution index measured using the mercury porosimeter were determined based on the above-described method (1). The results are shown in Table 1 and FIG. 3. Further, when observed based on the above-described method (2), the surface structure was observed to be a microfibril structure.

The surface roughness based on AFM (Nanopics-1000) was 55 μm.

Reference Example 4

Twenty parts by mass of high-density polyethylene (viscosity average molecular weight 280,000), 10 parts by mass of ultrahigh molecular weight polyethylene (viscosity average molecular weight 2,000,000), and 0.3 parts by mass of an antioxidant (Adeka Stab® AO-30) were mixed together. The resultant mixture was fed into a twin-screw extruder via a feeder. Then, 100 parts by mass of liquid paraffin (kinematic viscosity at 37.78° C. of 75.9 cSt) was melt-kneaded into the mixture at 240° C. by feeding the liquid paraffin into the twin-screw extruder by a side feeder. The obtained polymer gel was extruded from a T die arranged on the tip of the twin-screw extruder, then immediately cooled and solidified by a cast roll cooled to 25° C. to form a sheet having a thickness of 1.3 mm.

This sheet was simultaneously stretched at 127° C. by a factor of 7×7 with a biaxial stretching machine. The oriented film was then dipped in methyl ethyl ketone to extract the liquid paraffin. The oriented sheet from which the liquid paraffin had been removed was dried, and then heat-set at 125° C. to obtain a porous support member. The obtained porous support member had apertures of 11 g/m$^2$. Further, the piercing strength for a thickness of 20 μm, porosity of 43%, gas permeability of 350 seconds, at 100° C. was 4.0 N, and the thermal shrinkage at 100° C. was 5.0% in the MD and 3.0% in the TD. The produced porous support member is designated as "porous support member 4". The mode diameter and the pore size distribution index measured using the mercury porosimeter were determined based on the above-described method (1). The results are shown in Table 1 and FIG. 4. Further, when observed based on the above-described method (2), the surface structure was observed to be a microfibril structure.

Reference Example 5

Using a T die having a discharge width of 1,000 mm and a discharge lip opening of 3 mm, polypropylene having a melt index of 1.0 was melt-extruded at 200° C. The discharged film was introduced onto a 90° C. cooling roll, and 25° C. cool air was blown onto the film to cool it. The cooled film was then picked up at 12 m/min. The draft ratio at this stage was 150. The obtained un-stretched polypropylene film had a thickness of 27 μm.

This film was introduced into a circulating hot air oven heated to 130° C., and heat treated for 3 hours. The heat-treated film was then subjected to low-temperature stretching of 20% between nip rolls kept at 35° C. Then, the film was again introduced into a circulating hot air oven heated to 110° C. to carry out high-temperature stretching between the rollers by utilizing the difference in roll periphery speeds until the total stretching amount was 150%. The resultant laminated film was then relaxed by 20% by a roll heated to 125° C., and heat-set to continuously obtain a porous support member.

The obtained porous support member had apertures of 15 g/m². Further, the piercing strength for a thickness of 25 μm, porosity of 45%, gas permeability of 450 seconds, at 100° C. was 3.5 N, and the thermal shrinkage at 100° C. was 5.0% in the MD and 0% in the TD. The produced porous support member is designated as "porous support member 5". The mode diameter and the pore size distribution index measured using the mercury porosimeter were determined based on the above-described method (1). The results are shown in Table 1 and FIG. 5. Further, when observed based on the above-described method (2), the surface structure was observed to be a microfibril structure.

The surface roughness based on AFM (VN8000) was 33 μm.

Reference Example 6

Sixty parts by mass of high-density polyethylene (viscosity average molecular weight 280,000) and 0.3 parts by mass of an antioxidant (Adeka Stab® AO-30) were mixed together. The resultant mixture was fed into a twin-screw extruder via a feeder. Then, 100 parts by mass of liquid paraffin (kinematic viscosity at 37.78° C. of 75.9 cSt) was melt-kneaded into the mixture at 200° C. by feeding the liquid paraffin into the twin-screw extruder by a side feeder. The obtained polymer gel was extruded from a T die arranged on the tip of the twin-screw extruder, then immediately cooled and solidified by a cast roll cooled to 25° C. to form a sheet having a thickness of 2.5 mm.

This sheet was simultaneously stretched at 120° C. by a factor of 7×7 with a biaxial stretching machine. The oriented film was dipped in methyl ethyl ketone to extract the liquid paraffin. The oriented film from which the liquid paraffin had been removed was dried, then stretched by a factor of two in the horizontal direction at 125° C. and heat-set at 130° C. to obtain a porous support member. The obtained porous support member had a piercing strength for a thickness of 20 μm, porosity of 50%, gas permeability of 150 seconds, at 100° C. of 3.0 N, and the thermal shrinkage at 100° C. was 2.0% in the MD and 2.0% in the TD. The produced porous support member is designated as "porous support member 6". The mode diameter and the pore size distribution index measured using the mercury porosimeter were determined based on the above-described method (1). The results are shown in Table 1. Further, when observed based on the above-described method (2), the surface structure was observed to be a microfibril structure.

Reference Example 7

Using a T die having a discharge width of 1,000 mm and a discharge lip opening of 3 mm, polypropylene having a melt index of 1.0 was melt-extruded at 200° C. The discharged film was introduced onto a 90° C. cooling roll, and 25° C. cool air was blown onto the film to cool it. The cooled film was then picked up at 12 m/min. The draft ratio at this stage was 150. The obtained un-stretched polypropylene film had a thickness of 27 μm.

This film was introduced into a circulating hot air oven heated to 140° C., and heat treated for 3 hours. The heat-treated film was then subjected to low-temperature stretching of 20% between nip rolls kept at 35° C. Then, the film was again introduced into a circulating hot air oven heated to 110° C. to carry out high-temperature stretching between the rollers by utilizing the difference in roll periphery speeds until the total stretching amount was 150%. The resultant laminated film was then relaxed by 20% by a roll heated to 125° C., and heat-set to continuously obtain a porous support member.

The obtained porous support member had apertures of 12 g/m². Further, the piercing strength for a thickness of 25 μm, porosity of 50%, gas permeability of 300 seconds, at 100° C. was 3.0 N, and the thermal shrinkage at 100° C. was 5.0% in the MD and 0% in the TD. The produced porous support member is designated as "porous support member 7". The mode diameter and the pore size distribution index measured using the mercury porosimeter were determined based on the above-described method (1). The results are shown in Table 1. Further, when observed based on the above-described method (2), the surface structure was observed to be a microfibril structure.

Reference Example 8

Twenty parts by mass of high-density polyethylene (viscosity average molecular weight 280,000), 20 parts by mass of ultrahigh molecular weight polyethylene (viscosity average molecular weight 2,000,000), 42 parts by mass of dioctyl phthalate (DOP), and 18 parts by mass of fine silica as an inorganic filler material were mixed together to form granules. The resultant granules ware fed into a twin-screw extruder equipped with a T die, and melt-kneaded at 200° C. The obtained polymer gel was extruded to form a sheet having a thickness of 100 μm. The DOP was completely removed from the molded product by extraction using methyl ethyl ketone. Then, the fine silica was extracted and removed by dipping the molded product in aqueous caustic soda (20%, 60° C.) for 10 minutes, to obtain a support member. Two sheets of this support member were stacked on each other, and this stack was heated to 120° C. The stack was then stretched in the MD by a factor of 5, and then stretched in the TD by a factor of 2. The resultant porous support member obtained from two sheets had apertures of 13 g/m². The porous support member had a piercing strength of 2.8 N for a thickness of 22 μm, porosity of 48%, gas permeability of 80 seconds, at 100° C., and a thermal shrinkage at 100° C. of 8.0% in the MD and 3.0% in the TD. The produced porous support member is designated as "porous support member 8". The mode diameter and the pore size distribution index measured using the mercury porosimeter were determined based on the above-described method (1). The results are shown in Table 1 and FIG. 6. Further, when observed based on the above-described method (2), the surface structure of this film was observed to be a microfibril structure.

The surface roughness based on AFM (Nanopics-1000) was 236 μm.

Example 1

A solution prepared by the method described in the above (12) was coated on one side only of the porous support member 1 at a coating rate of 4.0 m/min by the micro gravure method described in the above (13). The coated solution was then dried at 80° C. to obtain a gas separation membrane. The obtained gas separation membrane exhibited a thermal shrinkage at 100° C. of 1.5% in the MD and 1.0% in the TD, and a piercing strength at 100° C. of 3.5 N. Further, the results of measurements carried out on the obtained gas separation membrane based on the conditions of the above (14) and (15) are shown in Table 1.

Example 2

A gas separation membrane was obtained in the same manner as in Example 1, except that the porous support member 2 was used instead of the porous support member 1. The obtained gas separation membrane exhibited a thermal shrinkage at 100° C. of 5.0% in the MD and 5.0% in the TD, and a piercing strength at 100° C. of 4.0 N. Further, the results of measurements carried out on the obtained gas separation membrane based on the conditions of the above (14) and (15) are shown in Table 1.

Example 3

A gas separation membrane was obtained in the same manner as in Example 1, except that the porous support member 3 was used instead of the porous support member 1. The obtained gas separation membrane exhibited a thermal shrinkage at 100° C. of 5.0% in the MD and 0% in the TD, and a piercing strength at 100° C. of 2.7 N. Further, the results of measurements carried out on the obtained gas separation membrane based on the conditions of the above (14) and (15) are shown in Table 1.

Example 4

A gas separation membrane was obtained in the same manner as in Example 1, except that the porous support member 4 was used instead of the porous support member 1. The obtained gas separation membrane exhibited a thermal shrinkage at 100° C. of 5.0% in the MD and 3.0% in the TD, and a piercing strength at 100° C. of 4.0 N. Further, the results of measurements carried out on the obtained gas separation membrane based on the conditions of the above (14) and (15) are shown in Table 1.

Example 5

A gas separation membrane was obtained in the same manner as in Example 1, except that the porous support member 5 was used instead of the porous support member 1. The obtained gas separation membrane exhibited a thermal shrinkage at 100° C. of 5.0% in the MD and 0% in the TD, and a piercing strength at 100° C. of 3.5 N. Further, the results of measurements carried out on the obtained gas separation membrane based on the conditions of the above (14) and (15) are shown in Table 1.

Example 6

A gas separation membrane was obtained in the same manner as in Example 1, except that the porous support member 6 was used instead of the porous support member 1. The obtained gas separation membrane exhibited a thermal shrinkage at 100° C. of 2.0% in the MD and 2.0% in the TD, and a piercing strength at 100° C. of 3.0 N. Further, the results of measurements carried out on the obtained gas separation membrane based on the conditions of the above (14) and (15) are shown in Table 1.

Example 7

A gas separation membrane was obtained in the same manner as in Example 1, except that the porous support member 7 was used instead of the porous support member 1. The obtained gas separation membrane exhibited a thermal shrinkage at 100° C. of 5.0% in the MD and 5.0% in the TD, and a piercing strength at 100° C. of 3.0 N. Further, the results of measurements carried out on the obtained gas separation membrane based on the conditions of the above (14) and (15) are shown in Table 1.

Comparative Example 1

A gas separation membrane was obtained in the same manner as in Example 1, except that the porous support member 8 was used instead of the porous support member 1. The obtained gas separation membrane exhibited a thermal shrinkage at 100° C. of 8.0% in the MD and 3.0% in the TD, and a piercing strength at 100° C. of 2.4 N. Further, the results of measurements carried out on the obtained gas separation membrane based on the conditions of the above (14) and (15) are shown in Table 1.

TABLE 1

|  | Units | Ex. 1 | Ex. 2 | Ex. 3 | Ex. 4 | Ex. 5 | Ex. 6 | Ex. 7 | Com. Ex. 1 |
|---|---|---|---|---|---|---|---|---|---|
| Gas Separation Membrane Oxygen Permeation Rate | GPU | 2000 | 2100 | 2500 | 2000 | 2550 | 1960 | 2300 | 1950 |
| Gas Separation Membrane Oxygen Permeation Rate (after 100° C. heat treatment) | GPU | 1600 | 1700 | 2000 | 1600 | 2030 | 1355 | 1900 | 1350 |
| Gas Separation Membrane Separation Coefficient α' |  | 2.3 | 2.3 | 2.3 | 2.3 | 2.3 | 1.9 | 2.3 | 1.7 |
| Gas Separation Membrane Separation Coefficient α' (after 100° C. heat treatment) |  | 2.3 | 2.3 | 2.3 | 2.3 | 2.3 | 2.3 | 2.3 | 1.6 |
| Gas Separation Membrane Piercing Strength (room temperature) | N | 5.0 | 5.0 | 3.5 | 4.5 | 3.5 | 4.0 | 3.0 | 3.5 |
| Gas Separation Membrane Piercing Strength (100° C.) | N | 3.5 | 4.0 | 2.7 | 4.0 | 3.5 | 3.0 | 3.0 | 2.4 |
| Gas Separation Membrane Thermal Shrinkage (100° C.) MD/TD | % | 1.5/1.0 | 5.0/5.0 | 5.0/0 | 5.0/3.0 | 5.0/0 | 2.0/2.0 | 5.0/0 | 8.0/3.0 |
| Gas Separation Membrane Thermal Shrinkage (120° C.) MD/TD | % | 5.0/2.7 | 13/15 | 12/0 | 10/5.0 |  |  |  | 12/10 |
| Gas Separation Membrane | μm | 20 | 16 | 25 | 20 | 25 | 20 | 25 | 22 |

TABLE 1-continued

Average Thickness

|  |  | Ref. Ex. 1 | Ref. Ex. 2 | Ref. Ex. 3 | Ref. Ex. 4 | Ref. Ex. 5 | Ref. Ex. 6 | Ref. Ex. 7 | Ref. Ex. 8 |
|---|---|---|---|---|---|---|---|---|---|
| Mode Diameter ($D_m$) | nm | 0.074 | 0.0898 | 0.0958 | 0.0799 | 0.0686 | 0.250 | 0.080 | 0.5704 |
| $D_a$ | nm | 40.4 | 43.1 | 65.5 | 40.3 | 42.0 | 54.5 | 47.3 | 72.4 |
| $D_b$ | nm | 184.1 | 180.4 | 119.7 | 184.7 | 93.0 | 530.1 | 163.3 | 1127.5 |
| Pore Size Distribution Index ($DI_{Hg} = D_b/D_a$) |  | 4.56 | 4.20 | 1.83 | 4.58 | 2.21 | 9.73 | 3.45 | 15.6 |
| Porous Support Member Thickness | μm | 20 | 16 | 25 | 20 | 25 | 20 | 25 | 22 |
| Porous Support Member Porosity | % | 40 | 39 | 45 | 43 | 45 | 50 | 50 | 48 |
| Porous Support Member Permeability | Seconds | 300 | 400 | 450 | 350 | 450 | 150 | 300 | 80 |
| Porous Support Member Piercing Strength (room temperature) | N | 5.0 | 5.0 | 3.5 | 4.5 | 3.5 | 4.0 | 4.0 | 3.5 |
| Porous Support Member Piercing Strength (100° C.) | N | 3.5 | 4.0 | 2.7 | 4.0 | 3.5 | 3.0 | 3.0 | 2.8 |
| Surface Roughness Ra | nm | 324 | 158 | 55 |  | 33 |  |  | 236 |

As can be clearly seen from the results of Table 1, for gas separation membranes formed with a similar gas separating resin layer on a porous support member, as compared to Comparative Example 1, which used a porous support member having a mode diameter as measured by the mercury porosimeter of more than 0.3 μm and a pore size distribution index as measured by the mercury porosimeter of more than 15, the gas separation membranes of Examples 1 to 7, which were obtained using a porous support member having a mode diameter in a range of from 0.005 μm to 0.3 μm and a pore size distribution index in a range of from 1 to 15, exhibited a superior oxygen permeation rate and a superior separation coefficient α. Further, in Example 3, which had a gas separation membrane that used a porous support member produced by a dry method, a gas separation membrane was obtained which had a superior oxygen permeation rate.

Further, for the gas separation membranes of Examples 1 to 7, the value of the separation coefficient α did not vary even after the heat treatment at 100° C., and were superior to the gas separation membrane of Comparative Example 1.

In addition, as illustrated in FIG. 7, it could be confirmed that the oxygen permeation rate of a gas separation membranes dramatically increases when the pore size distribution index as measured by a mercury porosimeter is about 4.

Industrial Applicability

The gas separation membrane according to the present invention can be used as a gas separation membrane in internal combustion engines, chemical processes, air conditioning, combustion furnaces and the like.

Figure 1:
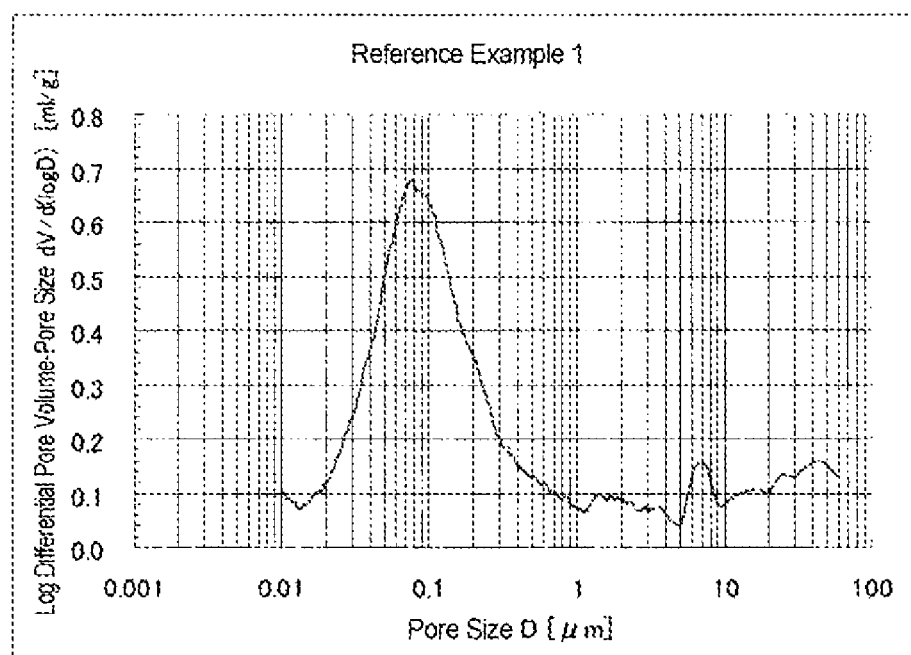
FIG. 1 shows a log differential pore volume-pore size curve of the porous support member 1 in Reference Example 1 as measured by the mercury porosimeter.
Figure 2:
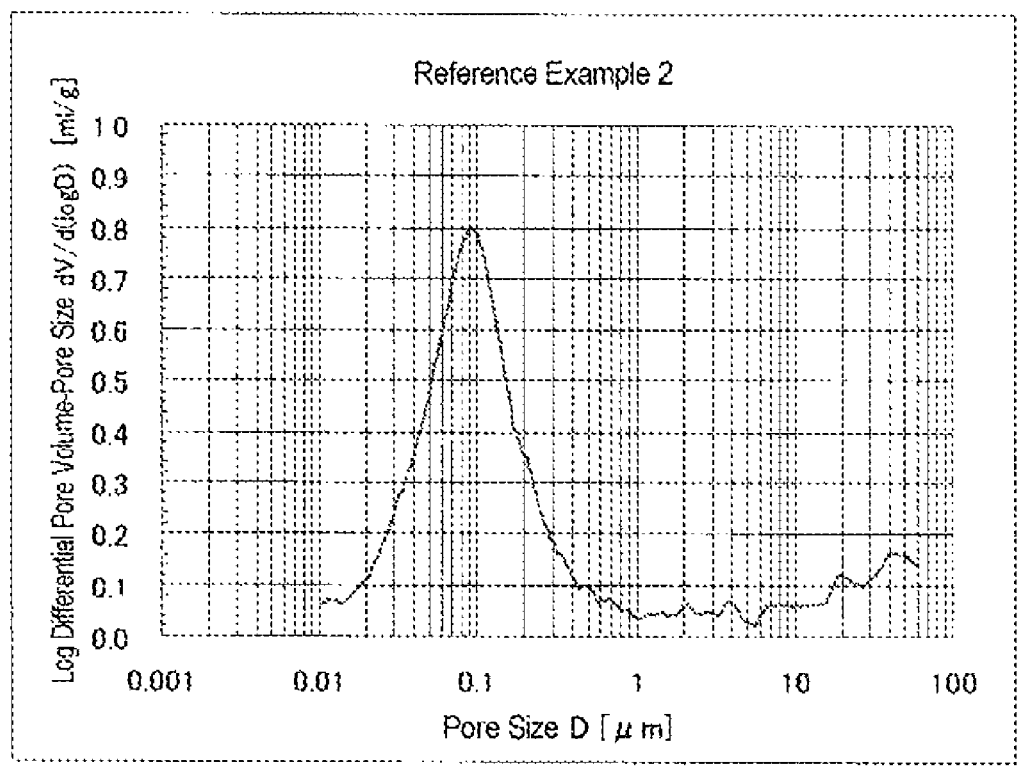
FIG. 2 shows a log differential pore volume-pore size curve of the porous support member 2 in Reference Example 2 as measured by the mercury porosimeter.
Figure 3:
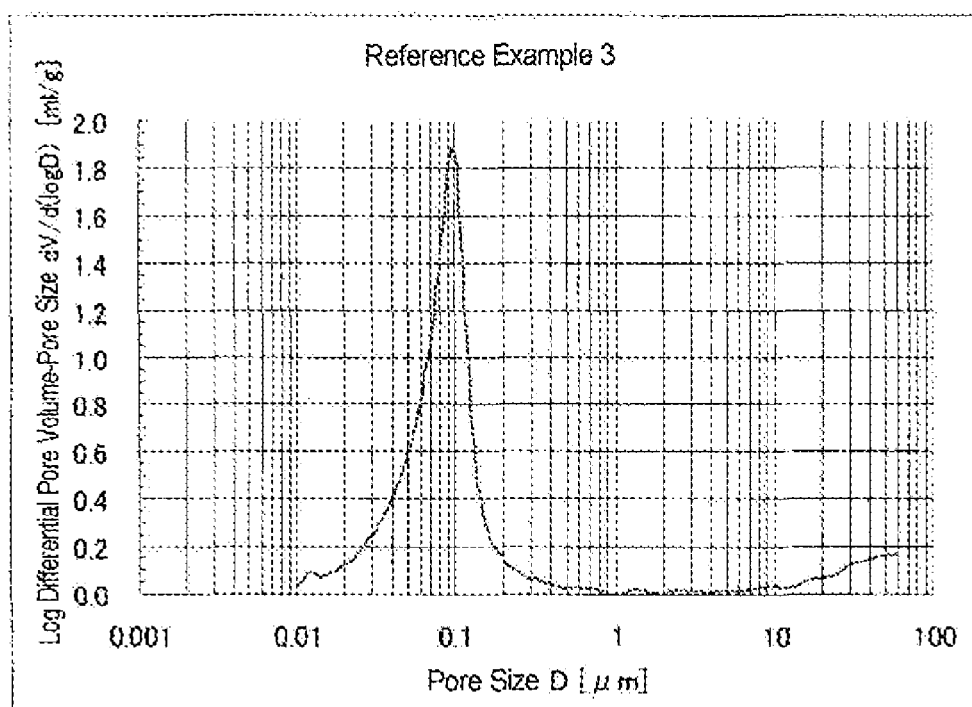
FIG. 3 shows a log differential pore volume-pore size curve of the porous support member 3 in Reference Example 3 as measured by the mercury porosimeter.
Figure 4:
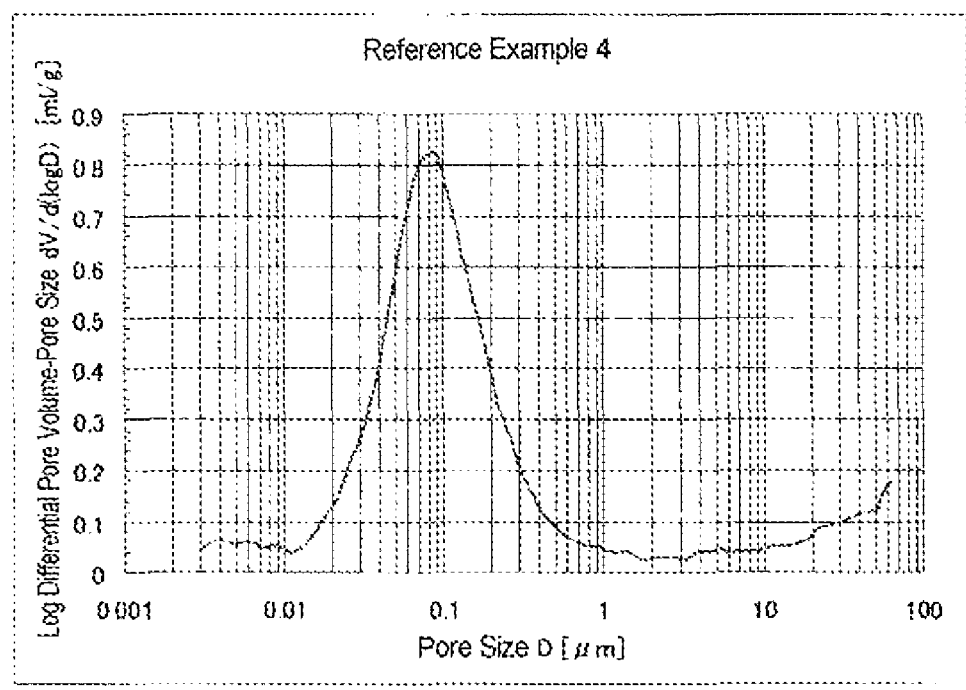
FIG. 4 shows a log differential pore volume-pore size curve of the porous support member 4 in Reference Example 4 as measured by the mercury porosimeter.
Figure 5:
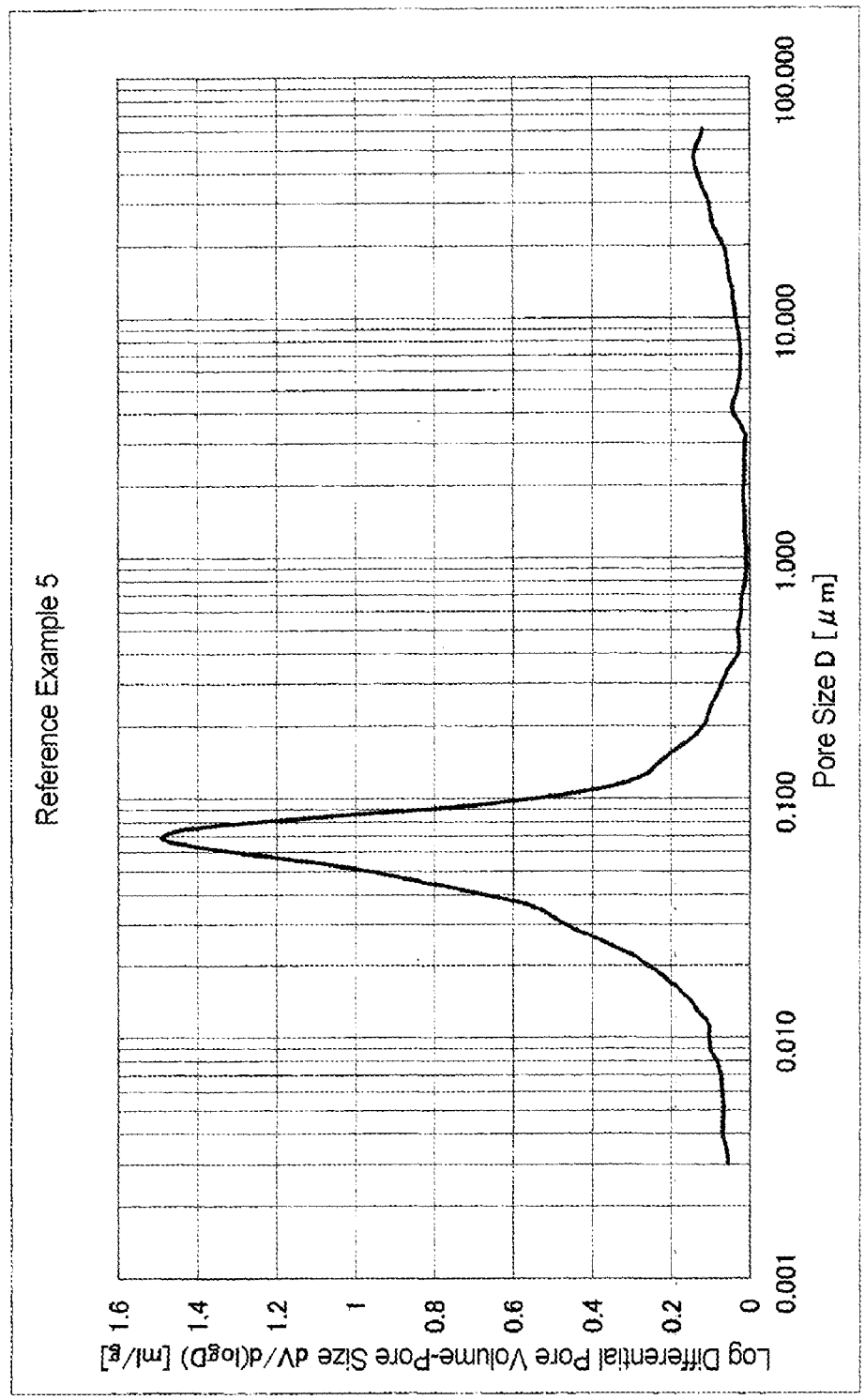
FIG. 5 shows a log differential pore volume-pore size curve of the porous support member 5 in Reference Example 5 as measured by the mercury porosimeter.
Figure 6:
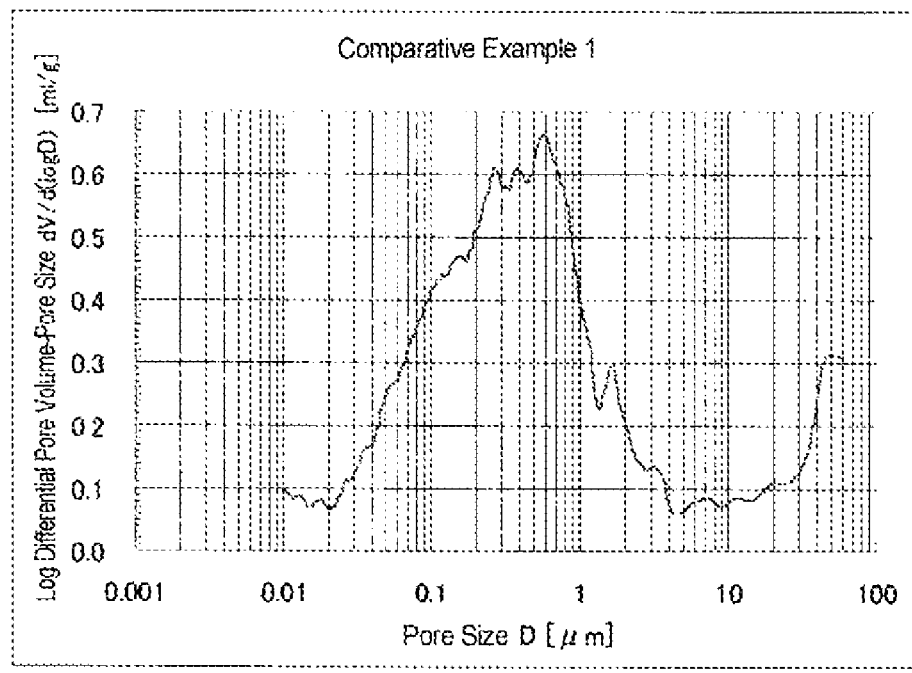
FIG. 6 shows a log differential pore volume-pore size curve of the porous support member 8 in Reference Example 8 as measured by the mercury porosimeter.
Figure 7:
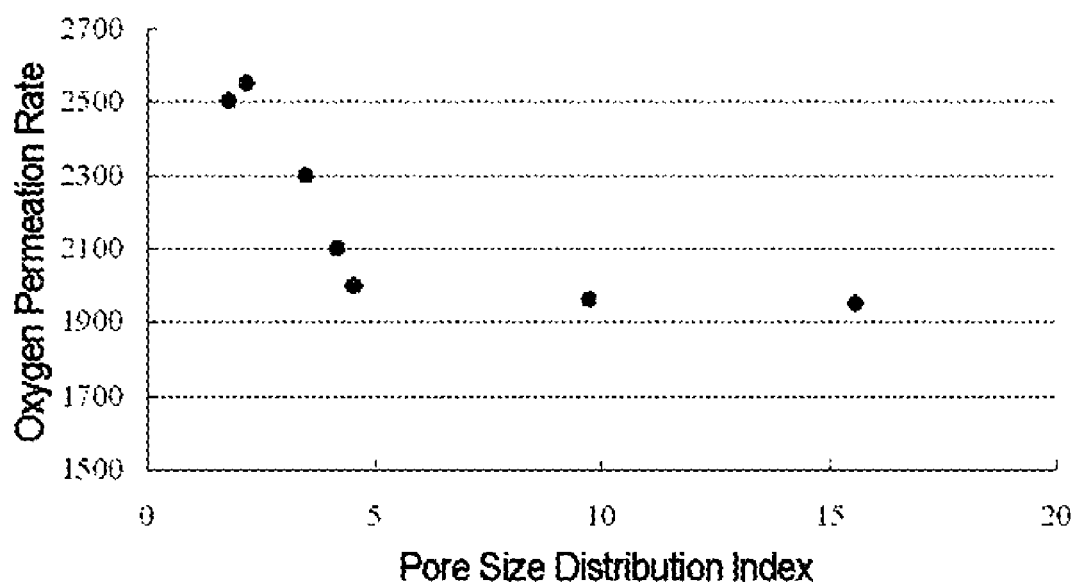
FIG. 7 shows the relationship between the pore size distribution index of the porous support members as measured by the mercury porosimeter and the oxygen permeation rate of the gas separation membranes.

The invention claimed is:

1. A gas separation membrane comprising a porous support member and a gas separating resin layer formed on the porous support member, wherein
    the porous support member has a mode diameter as measured by a mercury porosimeter of from 0.005 μm to 0.3 μm; and
    the porous support member has a pore size distribution index as measured by a mercury porosimeter of from 1 to 15.

2. The gas separation membrane according to claim 1, wherein the porous support member has a pore size distribution index as measured by a mercury porosimeter of from 1 to 4.

3. The gas separation membrane according to claim 1 or 2, wherein the porous support member comprises a polyolefin as a main component.

4. The gas separation membrane according to claim 1 or 2, wherein the porous support member comprises an ultrahigh molecular weight polyethylene having a viscosity average molecular weight of from 300,000 to 4,000,000 and/or a polypropylene having a viscosity average molecular weight of from 100,000 to 3,000,000.

5. The gas separation membrane according to claim 1 or 2, wherein the porous support member is produced by a dry method.

6. The gas separation membrane according to claim 1 or 2, wherein the gas separating resin layer comprises a fluorocarbon-based resin.

7. The gas separation membrane according to claim 1 or 2, wherein the gas separating resin layer comprises a copolymer of perfluoro-2,2-dimethyl-1,3-dioxole and tetrafluoroethylene.

8. The gas separation membrane according to claim 1 or 2, wherein the gas separating resin layer has an oxygen/nitrogen separation coefficient of 1.4 or more.

9. The gas separation membrane according to claim 1 or 2, wherein the gas separating resin layer has a thickness of 0.01 μm or more to 0.4 μm or less.

10. The gas separation membrane according to claim 1 or 2, wherein the porous support member has a porosity of 20% or more to 80% or less.

11. The gas separation membrane according to claim 1 or 2, wherein the gas separating resin layer has a mode diameter as measured by a mercury porosimeter of from 0.005 μm to 0.1 μm.

12. A nitrogen-enriched membrane comprising the gas seperation membrane according to claim 1 or 2.

13. An oxygen-enriched membrane comprising the gas seperation membrane according to claim 1 or 2.

* * * * *